United States Patent [19]
Ledebrink et al.

[11] 4,293,438
[45] Oct. 6, 1981

[54] METHOD OF PROCESSING RADIOACTIVE WASTES

[75] Inventors: Friedrich-Wilheim Ledebrink, Maintal; Wolfgang Stoll, Hanau; Dieter Schäfer, Aschaffenburg, all of Fed. Rep. of Germany

[73] Assignee: Alkem GmbH, Hanau, Fed. Rep. of Germany

[21] Appl. No.: 116,933

[22] Filed: Jan. 30, 1980

[30] Foreign Application Priority Data

Feb. 7, 1979 [DE] Fed. Rep. of Germany ....... 2904627

[51] Int. Cl.³ .............................................. G21F 9/30
[52] U.S. Cl. ..................... 252/301.1 W; 159/DIG. 12
[58] Field of Search .............................. 252/301.1 W; 159/DIG. 12

[56] References Cited

U.S. PATENT DOCUMENTS

4,119,560 10/1978 Sheeline ...................... 252/301.1 W
4,123,380 10/1978 Norell ......................... 252/301.1 W

*Primary Examiner*—Deborah L. Kyle
*Attorney, Agent, or Firm*—Herbert L. Lerner; Laurence A. Greenberg

[57] ABSTRACT

Recovering fission material from solid raw wastes and producing a space-saving product which can be committed to ultimate storage by the following steps:
(a) a comminution of the raw wastes to a grain size of about 5 mm
(b) dissolution thereof at elevated temperature in an organic solvent until a concentration of about 10 percent by weight is reached
(c) separation of insoluble raw waste particles larger than 1 mm.
(d) separation of the undissolved fission material content remaining in the polymer solution by means of a centrifuge
(e) evaporation and condensation of the solvents for return into the dissolving process according to (b)
(f) embedding the waste component from (c) into the remaining plastic melt
(g) drawing-off the melt and solidification thereof in storage containers.

6 Claims, 1 Drawing Figure

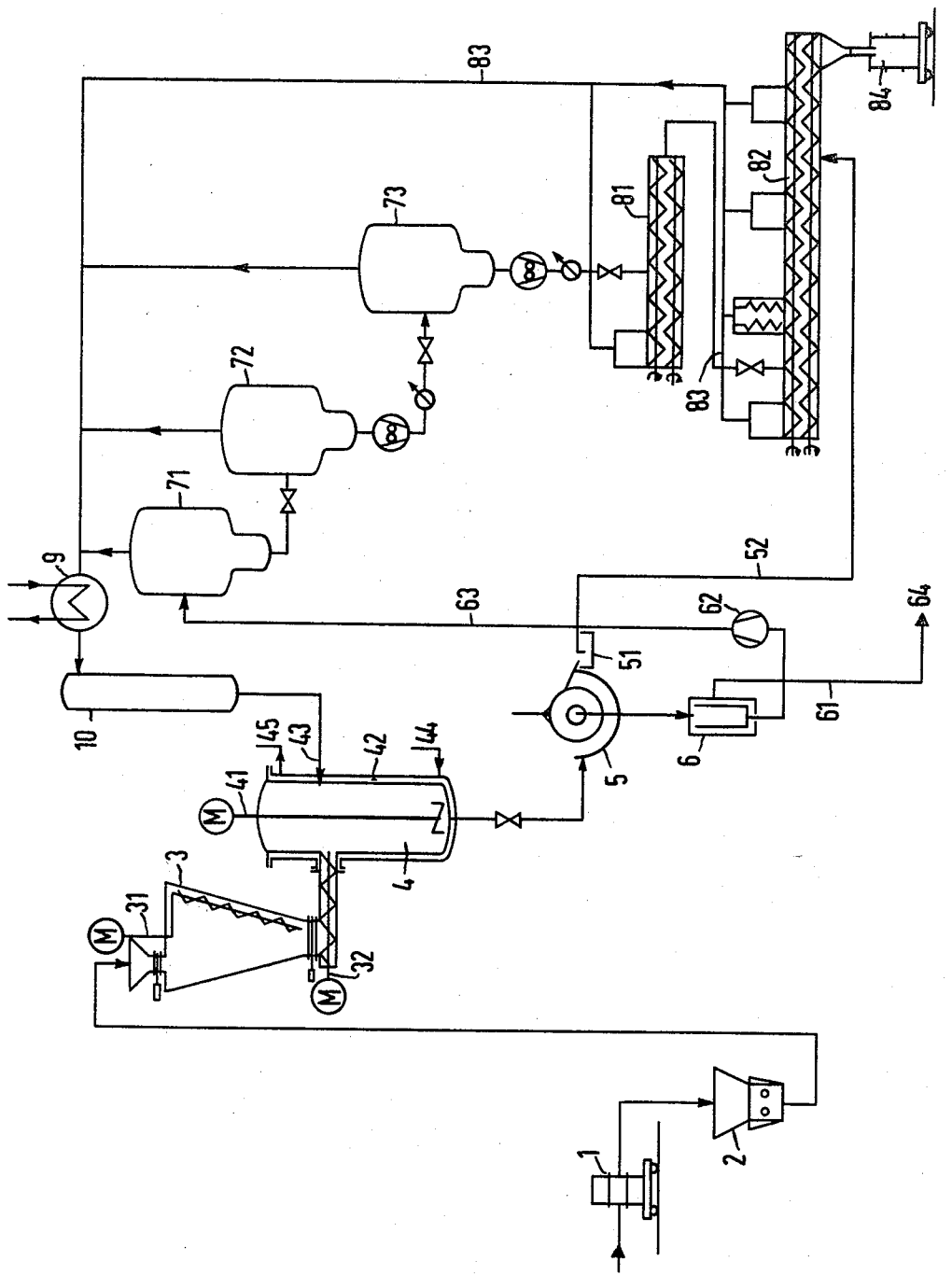

METHOD OF PROCESSING RADIOACTIVE WASTES

BACKGROUND OF THE INVENTION

1. Field of the Invention

The present invention relates to a method for recovering uranium and plutonium from solid raw wastes, especially from fabrication shops for nuclear fuels, and to the processing of the wastes freed of uranium and plutonium into a space-saving product that can be committed to ultimate storage.

2. Background of the Invention

The degree of contamination of these voluminous wastes which accumulate within the scope of control of a manufacturing operation differs greatly. Wastes with weighable, that is stronger, contamination by fission materials such as uranium and plutonium are produced almost exclusively in the glove boxes and amount to approximately one-half of the total wastes. As far as the material is concerned this waste contains PVC (polyvinyl-chloride), rubber, polystyrene (PS), polymethylmethacrylate (PMMA), polyethylene (PE), polytetrafluoroethylene (PTFE) and others. In addition to these plastics, cellulose and other burnable natural substances are also found in the waste material. Quantitatively, the PVC with a content of up to 70% by weight predominates in this mixture.

These wastes cannot be removed in the conventional manner, since they contain long-life radiotoxic fission materials (plutonium). In order to achieve ultimate storage of the wastes without danger, the objective of new treatment processes is the recovery of the fission materials, a reduction of the primary waste volume and the generation of a waste product that can be committed to ultimate storage.

Up to now one has confined oneself in practice to locking such wastes in cement blocks in order to obtain the lowest possible leaching rate vis-a-vis water or salt solutions and to store them ultimately in salt mines. It is a disadvantage of this method that the waste volume is expanded considerably and a recovery of plutonium at a later time is no longer possible.

To eliminate these disadvantages, a number of combustion methods has been developed primarily in the U.S.A., in which a concentration of the fission material to a small residual volume, the ash content was to be achieved. As can be seen from the survey report KfK-2250 of the Nuclear Research Center in Karlsruhe, no method has been able to attain production maturity, due to unresolved difficulties.

It is a common disadvantage of all combustion methods that, in the case of the mentioned wastes with a high PVC content, the contaminated secondary waste quantity in the fixed form ready for ultimate storage exceeds the starting volume of the primary wastes. In some high-temperature processes it is an additional aggravation that the plutonium, during the combustion, is converted into a very-hard-to-dissolve form, which makes recovery from the ash considerably more difficult.

Since up to now no method is known by which fission material recycling and at the same time a reduction of the volume are achieved, the problem arose to find a path for reaching the stated goal.

SUMMARY OF THE INVENTION

An object of the invention is to provide a method for treating solid raw wastes containing plastic soluble in an organic solvent, solid material insoluble in the organic solvent, and fission material, to recover the fission material and substantially reduce the waste volume and produce a waste product which can readily be committed to ultimate storage.

With the foregoing and other objects in view, there is provided in accordance with the invention a method for treating solid raw wastes containing as a major component plastic soluble in a liquid organic solvent, a minor component of a solid material insoluble in the liquid organic solvent and a minor component of fission material selected from the group consisting of uranium fission material and plutonium fission material, to separate and recover the fission material and convert the wastes freed of the fission material into a space-saving product which can be committed to ultimate storage, comprising the following steps:

(a) comminution of the raw wastes to a grain size in which the solid material component is not reduced to the same size as the fission material to facilitate later separation of larger solid material from the smaller fission material (b) admixing a liquid organic solvent in which the plastic is soluble, with the comminuted raw wastes to effect dissolution of the plastic at elevated temperature in the organic solvent (c) separation of undissolved larger waste chips from the polymer solution (d) separation of the undissolved fission material content from the polymer solution by means of a centrifuge (e) evaporation and condensation of the solvent for return into the dissolving process according to (b)

(f) embedding the waste component from (c) into the remaining plastic melt (g) drawing-off the melt and solidification thereof in storage containers.

Other features which are considered as characteristic for the invention are set forth in the appended claims.

Although the invention is illustrated and described herein as embodied in a method for processing radioactive wastes, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically shows apparatus for carrying out the method in accordance with the present invention.

DETAILED DESCRIPTION OF THE INVENTION

As mentioned previously, the solid raw wastes contain three different components. A major component is a plastic. The plastic is soluble in a known solvent. A minor component is a solid material or a mixture of solids insoluble in the solvent. These two components exist in various shapes which are appreciable in size. The third component is fission material which is powdery in nature and insoluble in the solvent.

According to the invention, the method proceeds according to the following steps:

(a) comminution of the raw wastes has for its purpose much more than making the plastic more readily soluble in the organic solvent. The additional purpose of comminution is to make possible easy separation of the solid material from the fission material. To this end the raw wastes are comminuted to a size short of, that is greater than the small grain size of the fission material to permit ready separation, as for example by filtration of the larger particles of solid material from the smaller grains of fission material contained in the solution of plastic in a solvent. Ordinarily comminution of the raw wastes to a grain size of 2–10, preferably about 5 is satisfactory. Comminution also has the added value of preparing the solid material for subsequently embedding into the plastic melt;

(b) dissolution thereof at elevated temperature, preferably about 50° to 100° C., in an organic solvent to dissolve the plastic in the raw wastes. In practice good results were obtained with an amount of solvent which reached a concentration of about 10 percent by weight solute;

(c) separation of insoluble solid particles. Ordinarily, it will be convenient to remove particles larger than 1 mm.

(d) separation of the undissolved fission material content remaining in the polymer solution which may be accomplished by means of a centrifuge;

(e) evaporation and condensation of the solvents for return into the dissolving process according to (b);

(f) embedding the waste component from (C) into the remaining plastic melt;

(g) drawing-off the melt and solidification thereof in storage containers.

This method according to the invention therefore is to dissolve the previously comminuted raw waste in an organic solvent, so that, merely after separating insoluble plastic particles, the undissolved impurities which are usually oxides of uranium and/or plutonium such as $UO_2$ and $PuO_2$ remain in solid but suspended form. As already mentioned, the raw wastes consist primarily of thermoplastics, for which several suitable organic solvents exist. There are also substances such as cellulose and wood or also strongly crosslinked plastics such as neoprene, which are insoluble in these solvents. However, according to experience, the total content of these insoluble materials does not exceed 25% of the total quantity of waste. They are therefore separated from the polymer solution according to step (c), before the latter is freed of solid fission material particles in centrifuges.

The method in accordance with the invention is shown schematically in the attached drawing. The wastes which are contaminated with uranium and/or plutonium and are welded into PVC bags in the normal manner, coming from, for instance, the work boxes in the fabrication shops, are first sorted by measurement by their plutonium content. Raw wastes with more than 5 grams fission material content per cubic meter are suited for the method according to the invention since with them, recycling of the fission material content pays off and is recommended.

This waste, which is also freed first in known manner of possibly present metal particles, is fed according to the drawing to known comminuting equipment 2 by means of a transport container 1. In the comminuting equipment, the wastes are comminuted, depending on the requirements of the process, to about 5 mm grain size and are stored in an intermediate bin 3 via a worm drive, not shown. The comminuted wastes are transported from this intermediate bin 3, by means of the stirrer 31 and the worm drive 32, into a tank 4 provided with a stirrer 41. Solvent is added to this tank 4 from the tank 10 via the line 43, and at the same time the temperature is increased to 60°–80° C. via a heat carrier or heating medium fed to the jacket 42 of the tank. The heat carrier consists, for example, of hot water entering at 44 and discharging at 45. An amount of the waste mixture is charged into the tank 4, sufficient to form a 10% polymer solution. The time required for the dissolving process is about 30 minutes.

The dissolution process is then followed by the step of separating the undissolved particles or chips from the heated polymer solution.

A barrel filter 5 is provided for the purpose of separating these coarse particles. The separated particles are washed with solvents, stripped off and transported to a collecting tank 51. The remainder of the solution with the suspended fission material particles is then transported to a centrifuge 6 which has a centrifuge effect of between 15,000 and 20,000 g. In the latter, the fission materials collect as a solid cake in the centrifuge cylinder. Because this centrifuge cylinder is designed with an inside diameter of only 80 mm, criticality safety is assured. The centrifuge tube is exchanged after sufficient fission material has accumulated and is taken in a transport container as indicated by line 61 to the fission material processing system 64.

The purified polymer solution then is pumped under pressure from the centrifuge 6 by the pump 62 through line 63 to three flash evaporators 71, 72, and 73 connected in series, and subsequently to the worm evaporator 81. Flash evaporators effect vaporization, i.e. "flashing", as is conventional, by maintaining a pressure in the vessel which is lower than the incoming liquid. While the flash evaporators increase the concentration of the polymer solution prevailing after the centrifuge from 10 to 40% by weight, the following worm evaporator evaporates the remaining part of the solvent. As shown in this example, it is advantageous to let the worm evaporator 81 be followed by a second worm evaporator 82, to perform with the latter the residual evaporation of the solvent to a residual content of less than 1% and to mix into the polymer melt leaving the worm evaporator at about 160° C. the insoluble solids separated in the barrel filter 5. These solids are transported from the tank 51 to the worm evaporator 82 via the line 52.

The flowable polymer melt with the embedded solids is then filled in a transport container 84, for instance a 400-l drum and forms there, after cooling down, a compact pore-free plastic block, into which other, non-combustible wastes such as glass, ceramic, or metallic machine parts can also be imbedded if desired. This block represents a leach-proof barrel, so that cementing is no longer necessary and a product capable of ultimate storage is provided.

The solvent vapors escaping from the evaporators are fed through lines 83 to a condenser 9, are liquified therein and then flow into the solvent tank 10, from which they are fed to the dissolving process in the tank 4 when required. The solvent is thus circulated in a closed loop continuously, so that the consumption thereof is extremely small. Suitable solvents are, for example, tetrahydrofuran or methy-ethyl ketone.

This method can, of course, be simplified from the start if in the fabrication operations only such materials are used which can all be dissolved in one suitable solvent. It is further suitable for recovery of other fine-dashed grain materials which are insoluble and may be radioactive.

This method according to the invention has the following advantages over the methods known heretofore:

1. recovery of plutonium and uranium without resorting to the use of chemical processes for this purpose
2. no change, i.e., impairment, of the solubility of $PuO_2$ and $UO_2$ during the treatment process in view of their treatment with nitric acid
3. no secondary waste is produced
4. the end product of the treatment process is capable of ultimate storage
5. The volume of the waste capable of ultimate storage is smaller by a factor 5 as measured against the volume of the raw wastes
6. no activity of any kind is liberated via the exhaust air
7. the required equipment is known and tested
8. no material problems due to thermal stresses arise, since the temperatures remain below 170° C.
9. critically safety is assured by appropriate geometrical dimensions of the equipment used
10. since no acids are produced or used, there are also no corrosion problems
11. since no exhaust gases are produced, no exhaust gas treatment equipment is required
12. radiolytic gas formation during the process is very small, since the contact time of the fission material with the solvent, approximately 1 hour, is very short
13. in view of the relatively low temperatures and the configuration of the heat circulation loop, the required power consumption is low.

We claim:

1. Method for treating solid raw wastes containing as a major component plastic soluble in a liquid organic solvent, a minor component of a solid material insoluble in the liquid organic solvent and a minor component of fission material selected from the group consisting of uranium fission material and plutonium fission material to separate and recover the fission material and convert the wastes freed of the fission material into a space-saving product which can be committed to ultimate storage, comprising the following steps:
   (a) comminution of the raw wastes to a grain size in which the solid material component is not reduced to the same size as the fission material to facilitate later separation of larger solid material from the smaller fission material
   (b) admixing a liquid organic solvent in which the plastic is soluble, with the comminuted raw wastes to effect dissolution of the plastic at elevated temperature in the organic solvent
   (c) separation of undissolved larger waste chips from the polymer solution
   (d) separation of the undissolved fission material content from the polymer solution by means of a centrifuge
   (e) evaporation and condensation of the solvent for return into the dissolving process according to (b)
   (f) embedding the waste component from (c) into the remaining plastic melt
   (g) drawing-off the melt and solidification thereof in storage containers.

2. Method according to claim 1, wherein the solvent is selected from the group consisting of tetrahydrofuran and methyl-ethyl ketone.

3. Method according to claim 1, or claim 2, wherein evaporation in step (e) is effected by subjecting the polymer solution first to flash evaporation and then to heating in worm evaporators, and also embedding the waste component in step (f) by incorporating said waste component into plastic melt in said worm evaporator.

4. Method according to claim 1, wherein comminution of the raw wastes in step (a) is to a grain size of 2-10 mm.

5. Method according to claim 1, wherein comminution of the raw wastes in step (a) is to a grain size of about 5 mm.

6. Method according to claim 1, wherein high-speed tube centrifuges with a centrifugal effect of 15,000 to 20,000 g are used for step (d).

* * * * *